(No Model.)
J. BLOSSER.
COMBINED HARROW AND PULVERIZER.
No. 253,342. Patented Feb. 7, 1882.
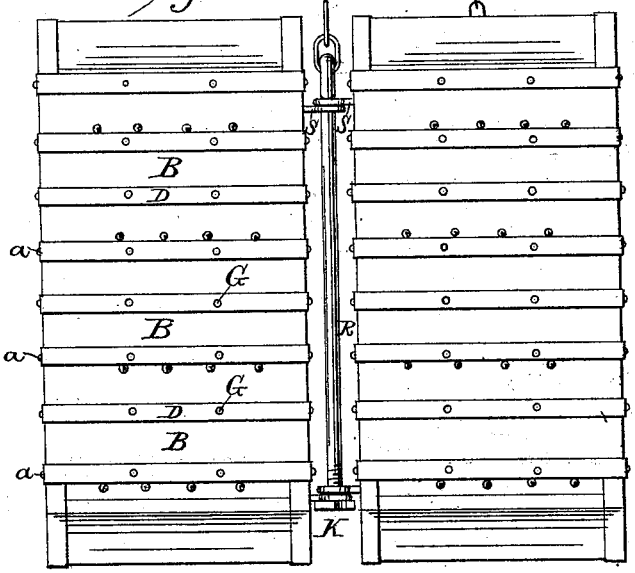
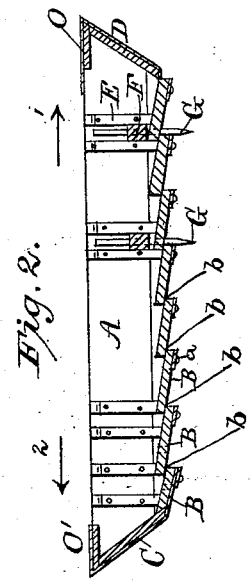
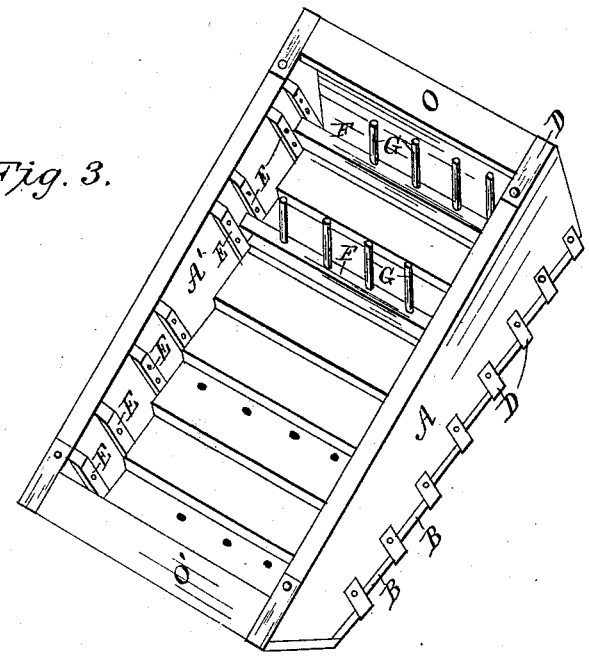
WITNESSES
F. M. Burnham.
Wm. C. McGill, Jr.
INVENTOR
Jacob Blosser
By Hyland MacDonald
and Alfred Graber
Attorneys
N. PETERS, Photo-Lithographer, Washington, D. C.

UNITED STATES PATENT OFFICE.

JACOB BLOSSER, OF BLOOMDALE, OHIO.

COMBINED HARROW AND PULVERIZER.

SPECIFICATION forming part of Letters Patent No. 253,342, dated February 7, 1882.

Application filed December 10, 1881. (No model.)

*To all whom it may concern:*

Be it known that I, JACOB BLOSSER, of Bloomdale, in the county of Wood and State of Ohio, have invented certain new and useful Improvements in Combined Harrow, Pulverizer, &c.; and I do hereby declare that the following is a full, clear, and exact description of the invention, which will enable others skilled in the art to which it appertains to make and use the same, reference being had to the accompanying drawings, which form a part of this specification.

My invention relates to a combined harrow, pulverizer, &c., and has for its object the complete breaking up of clods in plowed ground and the filling up of furrows and dead-furrows.

The invention consists in details of construction and combination of parts that will be hereinafter more fully set forth in the specification and claim, and pointed out in the accompanying drawings, in which—

Figure 1 is a plan view of my device; Fig. 2, a section, and Fig. 3 a perspective view, of same.

Referring more particularly to the drawings, A A' indicate the sides of my improved harrow, &c., having notches cut or sawed on the under sides or edges to form seats for cross-pieces B, each of which abuts against the shoulder formed by the vertical cut on the edges of A A'. These cross-pieces B extend across from side to side and form the bottom of the machine. Each successive piece, commencing from the forward end of the float, extends a little beyond the shoulder $b$ and breaks joint with the preceding cross-piece, thus forming a series of steps, as shown in Figs. 2 and 3. On the bottom of each cross-piece, near the shoulders $b$, are fastened metallic strips or plates D. (Shown more fully in Figs. 1 and 3.) The end pieces, O O', are let into the sides A to protect them from breaking apart by coming in contact with stones, hard clods, &c. Secured to the sides A A' on the inside of the float are guides E E, in which slide adjustable tooth-bars F, having a series of teeth, G, which pass through holes in the bottom or cross pieces, B.

I prefer to have two sets of bars F in the front of the machine, separated from each other the distance of one or two cross-pieces; but it is obvious that I may have more than two sets. I also prefer to have sets of guides at the rear end for the purpose of inserting tooth-bars when the harrow is reversed for packing the earth. By this form of construction and arrangement of the several parts I am enabled to graduate the depth to which the teeth shall enter the ground; or I may remove them entirely and use the float as a pulverizer and packer, thus dispensing with a roller.

In practice I use two floats joined or coupled together by a rod, R, passing through eye-bolts and held in place by a nut, K. This gives flexibility and enables me to harrow, pulverize, and pack uneven ground.

When it is desired simply to harrow and grate the ground the float is turned with the shoulders $b$ in the direction of the draft, as indicated by arrow 1. The plowed ground and clods broken up by the advance harrow-teeth are then brought in contact with the shoulders and grated. If it is simply desired to pack the ground after harrowing, the coupling R, with its hitching attachment, is placed at the opposite end of the float, the teeth-bars drawn up in their guides, and the earth packed by the surface of pieces B.

I may load the float with stones, or I may arrange a seat across the float and allow the driver to sit on one float.

The dimensions of the device may vary.

Having thus described my invention, what I claim is—

In a harrow and earth-packer, the combination of the notched side A, provided with guides for the reception of the tooth-bars, and cross-pieces B, seated in the notches of the sides A and having a metallic strip or plate, D, as and for the purpose set forth.

In testimony that I claim the foregoing as my own I have hereto affixed my signature in presence of two witnesses.

JACOB BLOSSER.

Witnesses:
ALFRED GROBER,
JNO. C. MARTIN.